United States Patent [19]

McLaughlin

[11] Patent Number: 5,266,210
[45] Date of Patent: Nov. 30, 1993

[54] PROCESS FOR REMOVING HEAVY METALS FROM WATER

[75] Inventor: Ronald J. McLaughlin, Arvada, Colo.

[73] Assignee: McLaughlin Water Engineers, Ltd., Denver, Colo.

[21] Appl. No.: 869,239

[22] Filed: Apr. 15, 1992

[51] Int. Cl.$^5$ .............................................. C02F 1/62
[52] U.S. Cl. .................... 210/710; 210/724; 210/725; 210/726; 210/727; 210/912
[58] Field of Search ................ 210/724–728, 210/732–734, 737, 912, 710

[56] References Cited

U.S. PATENT DOCUMENTS

| | | | |
|---|---|---|---|
| Re. 29,783 | 9/1978 | Smith et al. | 210/59 |
| 3,345,288 | 10/1967 | Sontheimer | 210/10 |
| 3,575,853 | 4/1971 | Gaughan et al. | 210/725 |
| 3,617,560 | 11/1971 | Deul et al. | 210/47 |
| 3,720,609 | 3/1973 | Smith et al. | 210/59 |
| 3,738,932 | 6/1973 | Kostenbader | 210/46 |
| 3,833,463 | 9/1974 | Croom | 162/29 |
| 3,846,293 | 11/1974 | Campbell | 210/725 |
| 3,947,350 | 3/1974 | Cardinal, Jr. | 210/10 |
| 3,997,438 | 12/1976 | Weiland et al. | 210/42 |
| 4,025,430 | 5/1977 | Pagel | 210/53 |
| 4,059,513 | 11/1977 | Zadera | 210/45 |
| 4,343,706 | 8/1982 | Etzel et al. | 210/912 |
| 4,415,467 | 11/1983 | Piepho | 252/181 |
| 4,419,246 | 12/1983 | Jayawant | 210/721 |
| 4,465,597 | 8/1984 | Herman et al. | 210/713 |
| 4,610,792 | 9/1986 | Van Gils et al. | 210/639 |
| 4,698,163 | 10/1987 | Zibrida | 210/713 |
| 4,802,993 | 2/1989 | Katoh | 210/912 |
| 5,000,858 | 3/1991 | Manning et al. | 210/709 |
| 5,028,272 | 7/1991 | Bonee | 106/792 |

FOREIGN PATENT DOCUMENTS 50-21565  3/1975  Japan ................................. 210/912

*Primary Examiner*—Peter Hruskoci
*Attorney, Agent, or Firm*—Sheridan Ross & McIntosh

[57] ABSTRACT

Wastewater contaminated with heavy metals is treated in a multi-stage process. In a first stage, wastewater is treated with an effective amount of calcium oxide and/or calcium hydroxide in the form of lime to adjust the pH so that various metals in the water become insoluble. Gypsum formation may also occur if sulfate ions are present in the wastewater. In a second stage, an effective amount of sodium carbonate is added in the form of soda ash to allow formation of calcium carbonate. In a third stage, a coagulant, preferably a polymer, is added to facilitate the formation of a sludge comprising heavy metals, gypsum and calcium carbonate. In a final stage, the pH of the resulting effluent may be adjusted with a suitable acid, such as hydrochloric acid, to attain acceptable discharge requirements. The sludge formed is substantially stable and dewatered and has low toxic metal leaching characteristics.

36 Claims, 2 Drawing Sheets

PROCESS FOR REMOVING HEAVY METALS FROM WATER

FIELD OF THE INVENTION

The present invention is directed to a method of treating water to remove undesired contaminants, and more particularly is directed to the removal of heavy metals and suspended solids, from water used in mining and metal plating operations to generate water suitable for discharge without the need for filtration. The present process also produces a highly stable de-watered sludge containing significantly more solids and having lower toxic metal leaching characteristics than sludge obtained in conventional water treatment processes.

BACKGROUND OF THE INVENTION

Present day commercial processes for treatment of wastewater containing undesired levels of sulfate and heavy metals largely consists of the treatment of water by filtration, ion exchange, reverse osmosis, or electrodialysis. Serious water disposal problems are also encountered in conventional water treatment systems due to the high levels of dissolved minerals and metals present in wastewater, such as industrial and mining wastewaters. The amount of heavy metals and dissolved solids present in water resulting from mining operations, for example, causes particular problems in the disposal of such wastewaters, especially in light of recent Environmental Protection Agency requirements. With the advent of these more stringent water disposal requirements, prior art processes have been found ineffective in efficiently reducing the concentration of heavy metals to acceptable levels.

A significant problem encountered in the treatment of wastewater is the formation of calcium sulfate and calcium carbonate scale. While lime based compounds have been used to soften water, the use of lime provides a source of calcium capable of combining with sulfate and carbonate ions present in wastewater, thus forming insoluble calcium complexes that add to the total suspended solids present in waste water.

Filters used in conventional water treatment processes suffer from clogging problems due to the accumulation of metal and calcium precipitates in the pores of such filters, rendering the filters ineffective and inoperable. To avoid such problems, others have utilized chelating agents and anti-scalants in an attempt to tie up calcium ions, and thereby prevent the formation of undesired calcium compounds such as gypsum and calcium carbonate. Still others have added sulfuric acid in an attempt to reduce the degree of scaling encountered in the treatment of wastewater. Addition of sulfuric acid, however, adds to the level of sulfate ions in wastewater. Moreover, the addition of anti-scalants necessarily increases the cost of water treatment procedures and has not been found to be totally effective in eliminating the scaling problems associated with the formation of undesired calcium compounds.

Many processes for the removal of dissolved heavy metals from industrial wastewater have been proposed. The precipitation of heavy metals by alkaline treatment of wastewater, for example, by treatment with sodium hydroxide, is known in the industry. However, the sludge formed in such processes contains significant amounts of water, creating additional disposal problems due to the volume of the sludge, toxic leaching potential of the sludge, and the significant expense involved in disposing of the sludge. Moreover, in the absence of a high solids content, the sludge resulting from sodium hydroxide/metal precipitation methods precludes the formation of a sufficiently clarified supernatant.

Various methods have been utilized in the past to treat water to remove undesired sulfates, calcium compounds and specific metals, such as magnesium. For example, U.S. Pat. No. 4,059,513 by Zadera discloses a water treatment method for reducing levels of sulfate and hardness by treating process water with calcium hydroxide to form calcium carbonate and calcium sulfate precipitates. After solid calcium sulfate precipitate is removed, raw process water is added to the effluent to allow bicarbonate present in the raw water to react with calcium ions, thereby precipitating calcium carbonate. Sulfuric acid is then added to increase the pH of the solution and thereby prevent scaling.

U.S. Pat. No. 4,462,713 by Zurcher et al. discloses a process in which sodium carbonate and sodium hydroxide are added to saline water to precipitate calcium carbonate. Sodium hydroxide is then added to the resulting filtrate to precipitate magnesium hydroxide. The resulting filtrate is then treated with calcium hydroxide to precipitate calcium sulfate, and, finally, sodium carbonate is added to the resulting filtrate to precipitate excess calcium as calcium carbonate. The final filtrate is then subjected to reverse osmosis, ion exchange or electrodialysis prior to discharge.

U.S. Pat. No. 4,465,597 to Herman et al. discloses an industrial wastewater treatment method in which heavy metals present in wastewater are precipitated to form a slurry and water suitable for environmental discharge is generated. Pursuant to the method, a aqueous mixture of a neutralizing agent absorbed on a carrier is mixed with industrial wastewater containing dissolved heavy metals to precipitate such heavy metals in the form of a slurry which, when allowed to settle, forms a high solids sludge. Herman, et al. discloses the utilization of neutralizing agents, including sodium hydroxide, potassium hydroxide, sodium carbonate, calcium carbonate and lime. Carriers such as particles of sand, silica, alumina, heavy metal oxides or recycled sludge are mixed with the neutralizing agent in a first reactor. The carrier and absorbed neutralizing agent are then mixed with industrial wastewater containing heavy metals in a second reactor to adjust the pH of the wastewater to within a range between about 8.4 and 10.6. At this pH, a substantial portion of the heavy metals are precipitated as oxides/hydroxides. A sludge is formed and water is removed and discharged to the environment. Herman et al., however, do not solve the problems associated with the formation of gypsum in lime-treated wastewater, and specifically Herman et al. fail to address post-precipitation problems encountered in the treatment of wastewater from mining and metal plating operations. Because gypsum formation is a slow, ongoing process, and because it is not effected by changes in the pH of wastewater, the water effluent obtained by Herman, et al. would still suffer from ongoing gypsum formation problems if the treated wastewater had high sulfate concentrations. Such high sulfate containing water is common in mining and metal plating operations. In addition, Herman et al. do not recognize how such gypsum formation can be substantially eliminated by the addition of a material capable of reducing the formation of gypsum, while at the same time facilitating the precipitation of heavy metals contained in wastewater. Herman et al. further do not address the toxic metal characteristic of leaching of sludges produced using their method, nor do Herman et al. discuss the level of total solids (i.e., suspended solids) present in their treated effluent.

None of the prior art methods provide for an economical water treatment method that is effective in the elimination of undesired heavy metals as well as dissolved solids, and that is capable of generating dischargeable water of substantial clarity. Significantly, the elimination of filtering steps and the elimination of costly chemicals such as sodium hydroxide would be desirable in a water treatment process to reduce the cost of such processes and the requisite maintenance involved in the use of filtration systems. A process that is effective in both removing undesired heavy metals from water and in avoiding the problems commonly associated with high concentrations of sulfate and calcium ions, such that water can be treated on-site (i.e., at a mining site operation) and can be subsequently discharged into local water sources, is a long felt but unsolved need. A process for removing heavy metals and suspended solids from water by forming a highly stable, significantly de-watered sludge, would also provide a solution to previously encountered sludge disposal problems.

SUMMARY OF THE INVENTION

The present invention relates to the treatment of wastewater to achieve effluent water quality levels through a multi-stage process. In the first stage, wastewater containing various heavy metals and sulfates is treated with an effective amount of calcium oxide and/or calcium hydroxide, preferably in the form of lime, to adjust the pH of the wastewater to a point where various metals in the water combine with hydroxide ions to form insoluble complexes. Gypsum formation also occurs due to the reaction of calcium ions, derived from the added lime, with sulfate ions present in the wastewater.

In a second stage, an effective amount of sodium carbonate (e.g., in the form of soda ash) is added to the lime-treated wastewater to allow the formation of calcium carbonate precipitate. The addition of soda ash results in the generation of a slurry containing gypsum, heavy metals and calcium carbonate.

A coagulant, preferably in the form of a polymer, can be added to the slurry in a third stage reaction to facilitate precipitation of heavy metal hydroxides, gypsum and calcium carbonate, thereby forming a sludge of considerable stability. The resulting supernatant is essentially free of suspended solids, typically containing in the range of about 2 to 20 parts per million of suspended solids, and most preferably less than about 2 to 5 parts per million suspended solids. In addition, the water produced is essentially free from undesired heavy metals.

In a fourth stage reaction the pH of the resulting supernatant can be adjusted using a suitable acid, such as hydrogen chloride, to bring the pH of the water within acceptable discharge requirements.

The present invention is also directed to the formation of a highly stable, de-watered sludge containing about 5 percent solids and more preferably above about 12 percent solids. The quantity of sludge produced using the present process is approximately one-third of the amount typically produced in conventional water treatment processes. The resulting sludge also has a significantly improved toxic metal characteristic leaching potential as compared with sludges produced using conventional water treatment processes.

DETAILED DESCRIPTION OF THE PREFERRED EMBODIMENT

The present invention is generally directed to the removal of heavy metals and undesired solids from wastewater, particularly water used in mining and metal plating operations. The term "wastewater" as used herein refers to water having undesirable levels of contaminants, typically encountered in run-off from mining activities and metal plating processes. Wastewater capable of treatment by the present process can contain various heavy metals, including zinc, manganese, magnesium, aluminum, nickel, mercury, tin, iron, chromium, silver, gold, cadmium, copper, barium, lead and selenium. The present process is particularly suitable for treating heavy metal containing wastewater containing significant amounts of sulfate, specifically wastewater containing above about 2000 mg/l of sulfate. Using the present method, effluent water quality levels exceeding the Environmental Protection Agency's best available technology levels can be achieved. The present method provides a simple, highly efficient process for removing undesired contaminants from water, primarily heavy metals, without the need for filtration and without significant post-precipitation problems commonly encountered in the treatment of wastewater from mining and metal plating operations.

Figure 1:
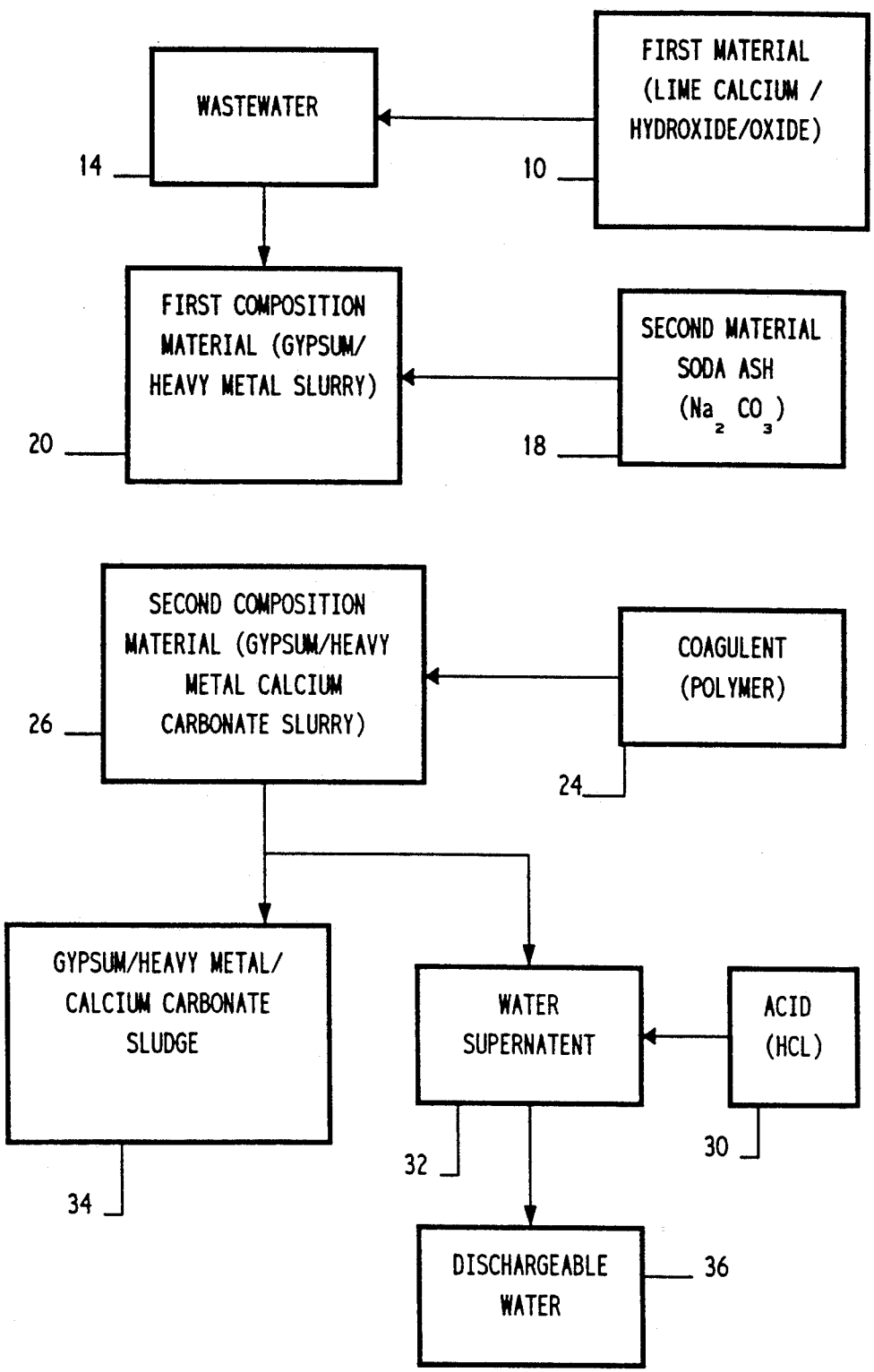
FIG. 1 is a flow diagram illustrating the use of the invention in treating water containing heavy metals.

FIG. 1 illustrates one embodiment of the present invention. Lime 10 is added to wastewater 14 containing heavy metals to form a gypsum/heavy metal slurry 20. To this slurry 20 soda ash 18 is added, resulting in the formation of a gypsum/heavy metal/calcium carbonate slurry 26. A coagulant 24 is then added to the resultant slurry 26 to assist in the precipitation of solids to form a gypsum/heavy metal/calcium carbonate sludge 34. The water supernatant 32 is then treated with acid 30 to generate dischargeable water 36.

The present method thus entails four separate stages. The first stage reaction involves the addition of an effective amount of a first material 10 to raise the pH of the wastewater 14 being treated to a desired level. In one embodiment, the first material 10 comprises calcium oxide and/or calcium hydroxide, preferably in the form of lime. An effective amount of lime 10 is added to the waste-water 14 in a first reaction stage in order to raise the overall pH of the wastewater 14 to a level where various metals in the wastewater 14 form insoluble compounds, thus forming a first composition material 20 comprising a gypsum/heavy metal slurry. The desired pH of the wastewater 14 to be achieved in any given process is largely dependent upon the particular metals which are to be removed. In one embodiment of the present invention, lime 10 is added to raise the pH of the first composition material 14 to between about pH 6 and about pH 11, and more preferably to between about pH 8 and about pH 11. For example, for wastewater containing zinc, the pH is adjusted to a pH of from about pH 8 to about pH 10; to remove manganese, the pH is adjusted to about pH 11; and to remove iron the pH is adjusted to about pH 6.5. The addition of lime is preferably controlled so that the pH of the wastewater does not rise above pH 12, because at such a high pH level several heavy metals are known to resolubilize (e.g., zinc). The uniform mixing of lime in the first age reaction may be facilitated by providing any one of several types of mixers standard in the industry.

The first composition material 20 (e.g. lime-treated wastewater) formed in the first stage reaction is detained for a sufficient amount of time to allow sufficient dissolution of the first material 10 (e.g. lime) and to permit metal ions present in the wastewater 14 to form insoluble complexes, most notably metal hydroxides. The detention time should be of sufficient duration to precipitate substantially all of the heavy metals and any insoluble salts. Mixing means may be provided to facilitate precipitation of the heavy metals.

The temperature of the wastewater has an effect on the requisite detention time. The warmer the wastewater is, the less detention time is necessary. For wastewater having a temperature of between about 32° F. and 60° F., the detention time of the first composition material 20 is approximately one to two hours. The present invention has particular application in the treatment of relatively cold water having temperatures of between about 32° F. and 50° F. In addition, the particular size of the reaction vessel used, the volume of wastewater being treated, and the amount of lime added to the wastewater, are but some of the variables to be considered in empirically determining the requisite detention time in any particular process. The detention time can also be determined by measuring the pH of the first composition material 20 over a period of time until pH stability of the solution is observed.

With the addition of lime 10 to the wastewater 14, calcium ions are made available that can react with sulfate ions present in the wastewater to form gypsum. As such, in the first stage reaction a metal hydroxide/gypsum slurry 20 is formed by the addition of lime 10.

After a sufficient detention time, an effective amount of a second material 18, preferably comprising soda ash, is added to the lime-treated wastewater 20 in a second stage reaction. Mixing of the soda ash 18 with the lime-treated wastewater 20 can be facilitated by using various types of mixing equipment common in the industry. The mixing of the second material 18 with the first composition material 20 defines a second composition material 26 in which the formation of gypsum is substantially reduced, if not eliminated. The addition of soda ash 18 promotes the formation of a calcium carbonate solid. With the removal of dissolved calcium, the second composition material 26 is no longer supersaturated with calcium and gypsum formation is substantially halted.

The amount of soda ash 18 added is largely dependent upon the sulfate concentration in the wastewater 14 and upon how much lime 10 was added in the first stage reaction to adjust the pH to desired levels. In some applications, approximately one third the amount of soda ash 18 is added in comparison to the amount of lime 10 added in the first stage reaction. The addition of soda ash 18 to the first composition material 20 allows for the formation of calcium carbonate solids. Small particulates of such calcium carbonate form and agglomerate to form larger granular structures, facilitating the formation of a semi-gelatinous sludge 34. The sludge 34 that settles can then be collected and removed for further use, disposal or further processing.

In a third stage reaction, the precipitation of heavy metals from the second composition material 26 is facilitated. In one embodiment, an effective amount of a coagulant 24, preferably a non-ionic or slightly anionic polymer, is added to aid in the precipitation of solids to form a sludge 34 comprising calcium carbonate, heavy metals and gypsum. Effective coagulant polymers are typically long chain organic molecules that act as agglomeration enhancing substances, coating precipitated particles in a manner so that such particles come together to form larger particles. A coagulant found to be particularly effective in the present process is NALCO 7877 TM. Coagulant polymers 24 may be added in an amount from about 1 to about 30 milligrams per liter, and more preferably in doses of 2 to 5 milligrams per liter of solution. The sludge 34 formed by the addition of coagulants 24 has a reduced water content when compared to sludge formed without the addition of such coagulants. The addition of a coagulant 24 is also believed to agglomerate fine particles present in solution, further adding to the clarification of dischargeable water 36.

After the precipitation of heavy metals and the formation of the sludge 34, substantially all water is then separated from the resultant sludge as a supernatant 32. The water 32 so separated may then be treated in a final fourth stage reaction by the addition of a suitable acid 30 to adjust the pH of the water 32 to desired levels in accordance with applicable state and federal water discharge regulations. In one embodiment, the pH of the dischargeable water 36 is adjusted to be between about pH 6 and about pH 9, and more preferably between about pH 6.5 and pH 8.5.

The present invention can be used in either a batch or a continuous process. In either case, it is important that each ingredient be added and sufficiently mixed in sequential fashion and that each added ingredient be allowed to react for a sufficient amount of time. In a batch process, lime 10 can be added to the wastewater as described above, to raise the pH of the wastewater 14 to an effective level in order that heavy metal hydroxides precipitate from solution. Soda ash 18 can then be added to the first composition material 20 in an effective amount to substantially halt the formation of gypsum and to generate a calcium carbonate precipitate. An effective coagulant can then be added to the resultant second composition material 26 to facilitate the formation of a sludge 34 comprised of heavy metal hydroxides, gypsum and calcium carbonate. The resultant water supernatant 32 can then be separated from the sludge 34 formed. In a batch process, it is important to separate the sludge 34 from the supernatant 32 prior to the addition to the supernatant 32 of an acid 30 effective in lowering the pH to an appropriate level for discharge of the water 36, thus precluding the resolubilization of precipitated metals.

Figure 2:
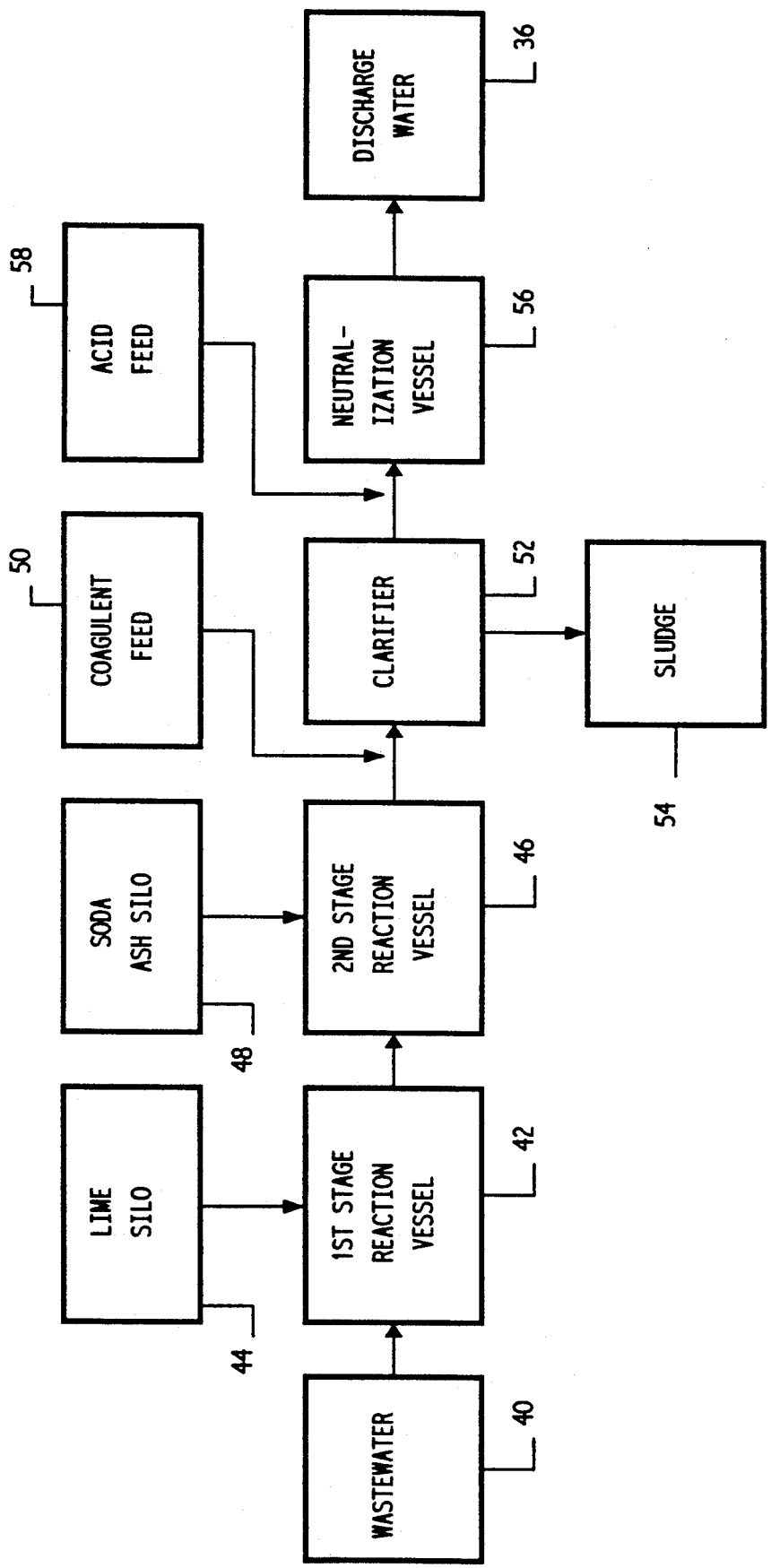
FIG. 2 is a flow diagram illustrating a continuous flow embodiment of the present invention.

Although the present invention can be practiced in a batch process, it is particularly advantageous to utilize the present invention in a continuous process (see FIG. 2.) In a continuous process, wastewater 40 to be treated is directed to a first stage reaction vessel 42. In the first reaction vessel 42, an effective amount of dry lime from a lime silo 44 is mixed with the wastewater 40 to form metal hydroxide complexes. After this reaction is substantially complete (typically within one to two hours depending upon various factors such as temperature and vessel size) the lime-treated wastewater is transferred to a second reaction vessel, 46 and an effective amount of dry soda ash from a soda ash silo 48 is added. Sufficient agitation and mixing is provided to promote the formation of calcium carbonate precipitate, such reaction substantially halting the further formation of gypsum due to the removal of calcium ions from the solution.

A polymer coagulant from a coagulant feed 50 is added either to the second reaction vessel 46 or before the soda ash-treated water enters a clarifier 52 in order to facilitate the precipitation of heavy metals and suspended solids as a sludge 54. The resultant supernatant can then be conveyed to a neutralization vessel 56 where an appropriate type and amount of acid from an acid feed 58, preferably hydrochloric acid, can be added to adjust the pH level of the supernatant to coincide with required discharge requirements.

Using the present invention, a sludge containing about 5 percent solids can be precipitated from heavy metal and sulfate containing wastewater. More preferably, sludge produced using the present process contains from about 5 to about 12 percent solids and most preferably above at least 12 percent solids. In comparison, sludges attainable in conventional processes typically consist of about 1 percent solids content. Approximately ⅔ less sludge is produced using the present invention than by using conventional water treatment processes.

The sludge formed in the present process is substantially stable, and has toxic characteristic leaching procedure (TCLP) levels of less than currently required reporting limits. Table 1 indicates the measurement of toxic characteristic leaching procedure levels of sludge produced in accordance with the present invention. The present process allows for the formation of a sludge having toxic leaching characteristics below Environmental Protection Agency acceptable limits.

TABLE I

TOXIC CHARACTERISTIC LEACHING PROCEDURE LEACHATE

| ANALYTE | REPORTING LIMIT (MG/L) | AMOUNTS DETECTED USING PRESENT INVENTION |
|---|---|---|
| Arsenic | 0.5 | Less than limit |
| Barium | 5.0 | Less than limit |
| Cadmium | 0.1 | Less than limit |
| Lead | 0.5 | Less than limit |
| Mercury | 0.02 | Less than limit |
| Selenium | 0.5 | Less than limit |
| Silver | 0.1 | Less than limit |

The stability achieved using the present process is believed to be partially the result of the increased alkalinity provided by the addition of soda ash. The risk that metals may resolubilize is also minimized due to the buffering capacity of the carbonate present in the soda ash-treated wastewater.

The multiple stage reaction as presented in the present invention permits the pH of a wastewater solution to be adjusted so that undesired metals can be precipitated from solution without increasing the pH to a level at which such metals may resolubilize. The present invention also provides a method for generating sludge with superior stability characteristics without the necessity of increasing the pH of the sludge. The addition of lime in the process also promotes the formation of gypsum, thereby removing some undesired sulfate ions from the wastewater. The second stage of the reaction entails the addition of soda ash in effective amounts to precipitate substantially all undesired calcium as calcium carbonate, thereby substantially halting the formation of gypsum.

The present invention thus permits the substantial removal of heavy metals from wastewater and reduces the significant problems resulting from the formation of gypsum and calcium carbonate. Because the present invention does not require filtering in the treatment of wastewater, a major problem in prior art processes is eliminated: the clogging of filters by metal hydroxides, gypsum and calcium carbonate precipitates. As such, use of the present process provides for the elimination of filtration processes previously believed necessary to achieve high quality effluent requirements. Significant savings in capital and operating costs are therefore achieved by use of the present invention, in addition to the improved settling and water clarity characteristics resulting from the use of the process.

The water resulting from the present invention contains extremely low levels of suspended solids, usually less than 5 parts per million and typically less than 2 parts per million of suspended solids. Moreover, the sludge produced using the present process has superior dewatering and toxic metal leaching characteristics as compared to sludge produced in conventional processes.

The following examples are provided for purposes of illustration and are not intended to limit the scope of the present invention.

EXAMPLES

Example 1

Water collected from a surge pond (i.e., Raw Water A) (see Table II) was subjected to the present process and 2000 milliliter samples were collected for analysis. 10.5 milligrams per liter of lime was added to the raw water A and the lime-treated wastewater was detained for approximately 60 minutes. Approximately 5 milligrams per liter of soda ash was then added to the lime-treated water and the soda ash-treated water was detained for approximately 30 minutes. Approximately 10 milligrams per liter of a polymer coagulant was then added to the lime/soda ash-treated water and precipitation was allowed to occur for approximately 10 minutes. The polymer was added to the lime/soda ash treated wastewater in a clarifier provided with a mixer spinning at 40 revolutions per minute for 10 minutes. The mixing speed was then slowed to 12 revolutions per minute for an additional 5 minutes. The presence of various metals and suspended solids were then analyzed as set forth in Table III under Test Water #1.

Example 2

A water mixture consisting of 40 percent of Raw Water B, 40 percent of Raw Water C and 20 percent of Raw Water D (See Table II) was subjected to the present process and 2000 milliliter samples were collected for analysis. 15.75 milligrams per liter of lime was added to the water mixture and the lime-treated wastewater was detained for approximately 60 minutes. Approximately 6.0 milligrams per liter of soda ash was then added to the lime-treated water and the soda ash-treated water was detained for approximately 30 minutes. Approximately 12 milligrams per liter of a polymer coagulant was then added to the lime/soda ash-treated water and precipitation was allowed to occur for approximately 10 minutes. The polymer was added to the lime/soda ash treated wastewater in a clarifier provided with a mixer spinning at 40 revolutions per minute for 10 minutes. The mixing speed was then slowed to 12 revolutions per minute for an additional 5 minutes. The presence of various metals and suspended solids were then analyzed as set forth in Table III under Test Water #2.

TABLE II

Analysis of Heavy Metal and Suspended Solid Content of Raw Water Samples

| ANALYSIS | UNITS | RAW WATER A | RAW WATER B | RAW WATER C | RAW WATER D |
|---|---|---|---|---|---|
| CALCIUM | mg/L | 547 | 424 | 196 | 666 |
| MAGNESIUM | mg/L | 690 | 1610 | 530 | 1100 |
| SODIUM | mg/L | 69 | 120 | 148 | 72 |
| POTASSIUM | mg/L | 68 | 14 | 4.4 | 6.0 |
| BICARBONATE | mg/L | ND < 0.1 | ND < 0.1 | ND < 0.1 | ND < 0.1 |
| HYDROXIDE | mg/L | ND < 0.01 | ND < 0.01 | ND < 0.01 | ND < 0.01 |
| CARBONATE | mg/L | ND < 0.1 | ND < 0.1 | ND < 0.1 | ND < 0.1 |
| SULFATE | mg/L | 4000 | 6700 | 4300 | 5000 |
| CHLORIDE | mg/L | 25 | 37 | 14 | 22 |
| CADMIUM | mg/L | 0.36 | 0.08 | 0.17 | 0.65 |
| MANGANESE | mg/L | 695 | 1360 | 561 | 510 |
| IRON | mg/L | 700 | 1000 | 2430 | 260 |
| COPPER | mg/L | 0.87 | 0.76 | 0.77 | 0.85 |
| ARSENIC | mg/L | NC < 0.01 | 0.11 | 0.01 | ND < 0.01 |
| BARIUM | mg/L | 4.2 | 3.1 | 1.2 | 5.0 |
| CHROMIUM | mg/L | ND < 0.01 | 0.05 | ND < 0.01 | ND < 0.01 |
| LEAD | mg/L | 0.32 | 0.07 | 0.15 | 0.30 |
| SELENIUM | mg/L | ND < 0.01 | 0.02 | ND < 0.01 | ND < 0.01 |
| SILVER | mg/L | 0.05 | 0.01 | 0.001 | 0.004 |
| ZINC | mg/L | 260 | 384 | 270 | 294 |
| TOTAL ALKALINITY | mg/L | ND < 0.1 | ND < 0.1 | ND < 0.1 | ND < 0.1 |
| HARDNESS | mg/L | 4200 | 7660 | 2660 | 6180 |
| pH | | 2.7 | 3.0 | 2.9 | 3.0 |
| SPECIFIC CONDUCTANCE | MM/cm | 5000 | 6000 | 5500 | 7000 |
| SUSPENDED SOLIDS | mg/L | 498 | 823 | 292 | 269 |

*ND < means "none detected less than."

TABLE III

Analysis of Water Produced Using the Present Invention

| ANALYSIS | UNITS | TEST WATER #1 | TEST WATER #2 |
|---|---|---|---|
| CALCIUM | mg/L | 483 | 515 |
| SULFATE | mg/L | 4000 | 3500 |
| (DISSOLVED) MAGNESIUM | mg/L | 23 | 50 |
| (DISSOLVED) MANGANESE | mg/L | 0.34 | 0.38 |
| (DISSOLVED) IRON | mg/L | 0.09 | 0.07 |
| (DISSOLVED) COPPER | mg/L | 0.02 | 0.02 |
| (DISSOLVED) CADMIUM | mg/L | ND < 0.001* | ND < 0.001 |
| (DISSOLVED) LEAD | mg/L | 0.08 | 0.09 |
| (DISSOLVED) ZINC | mg/L | 0.04 | 0.01 |
| pH | | 7.7 | 9.1 |
| SUSPENDED SOLIDS | mg/L | 13 | 22 |
| (TOTAL) COPPER | mg/L | 0.10 | 0.10 |
| (TOTAL) IRON | mg/L | 0.16 | 0.48 |
| (TOTAL) LEAD | mg/L | 0.11 | 0.12 |
| (TOTAL) MANGANESE | mg/L | 0.36 | 0.60 |
| (TOTAL) ZINC | mg/L | 0.08 | 0.18 |
| (TOTAL) CADMIUM | mg/L | ND < 0.001 | ND < 0.001 |

*ND < means "none detected less than."

The values for the dissolved metals re set forth in Table III for test Waters #1 and #2, respectively. The Total levels for the metals set forth in Table III represent the presence of both dissolved and undissolved levels of the various metals found in each of Test Waters #1 and #2, respectively.

While the various embodiments of the present invention have been described in detail, it is apparent that various modifications and adaptions of those embodiments will occur to those skilled in the art. It is expressly understood, however, that such modifications and adaptions are within the scope of the present invention as set forth in the following claims.

What is claimed is:

1. A process for removing heavy metals from wastewater, comprising:
    (a) supplying wastewater having heavy metal ions therein and containing a sufficient amount of sulfate ions capable of reacting with calcium ions to form gypsum;
    (b) adjusting the pH of said wastewater to a pH of between about pH 6 and about pH 11 by addition of a first material capable of forming gypsum and insoluble heavy metal hydroxides;
    (c) mixing an effective amount of a second material to substantially reduce the formation of said gypsum in said wastewater and to promote the formation of a calcium carbonate solid;
    (d) separating without the use of a filter said wastewater from said metal hydroxide and calcium carbonate.

2. The process of claim 1, wherein said separating step includes producing a sludge that is substantially stable.

3. The process of claim 1, further comprising the step of adding a coagulant to facilitate the precipitation of metal hydroxides from said wastewater.

4. The process of claim 1, wherein said process is conducted in a continuous manner.

5. The process of claim 1, wherein said water produced by said process contains less than about 25 mg/l suspended solids.

6. The process of claim 1, wherein said water produced by said process contains less than about 5 parts per million of suspended solids.

7. The process of claim 1, wherein said wastewater containing heavy metal ions contains at least about 2000 mg/l sulfate.

8. A process for removing heavy metals from wastewater, comprising:
(a) adding an effective amount of lime to wastewater containing heavy metals to form metal hydroxides wherein said wastewater contains a sufficient amount of sulfate ions capable of reacting with calcium ions to form gypsum;
(b) adding to wastewater treated in accordance with step (a) an effective amount of soda ash to form calcium carbonate, said addition of soda ash capable of substantially reducing the formation of said gypsum; and
(c) separating substantially all water from a sludge containing said heavy metal hydroxides and calcium carbonate, such separation capable of being performed without the use of a filter.

9. The process as set forth in claim 8, wherein an effective amount of lime is added to said water to achieve a pH of between about pH 6 and about pH 11.

10. The process as set forth in claim 8, wherein lime is added to said water to achieve an effective pH of between about pH 8 and about pH 11.

11. A process as set forth in claim 8, wherein said steps (a), (b) and (c) include adequate mixing of said lime, soda ash and coagulant.

12. The process of claim 8, wherein said sludge comprises metal-hydroxides, calcium carbonate and gypsum.

13. The process of claim 8, wherein said amount of soda ash is effective in substantially halting the formation of gypsum.

14. The process of claim 8, wherein said separated water contains less than the maximum levels of heavy metals and suspended solids as set forth in discharge requirements.

15. The process of claim 8, wherein said process is capable of substantially removing heavy metals and suspended solids from wastewater in the absence of filtering.

16. The process of claim 8, wherein the water produced contains less than about 20 parts per million of suspended solids.

17. The process of claim 8, wherein said addition of lime is conducted in a manner so that substantially all metal ions in said wastewater react to form metal hydroxides.

18. The process of claim 8, wherein said lime added step (a) is substantially free of carbonate compounds.

19. The process of claim 8, further comprising an effective amount of an acid to reduce the pH of said separated water to a pH range of between about 6 and about 9.

20. The process as set forth in claim 19, wherein said acid comprises hydrochloric acid.

21. A process as set forth in claim 8, further comprising detaining water treated in accordance with step (a) for a period of between about 1 and about 2 hours to facilitate the reaction of metal ions with hydroxide ions.

22. A process as set forth in claim 8, further comprising detaining water obtained after step (b) for a sufficient amount of time to permit calcium carbonate solids to form.

23. A process as set forth in claim 8, wherein said coagulant is added in an amount from about 1 to about 30 milligrams per liter of wastewater.

24. A process as set forth in claim 8, wherein said coagulant is added from about 2 to about 5 milligrams per liter of wastewater.

25. A process as set forth in claim 8, wherein said steps (a) and (b) are performed in separate reaction vessels.

26. A process as set forth in claim 8, further comprising recovering metals from said sludge.

27. A process as set forth in claim 8, wherein said sludge is substantially dewatered.

28. A process as claimed in claim 8, wherein said sludge is substantially stable and has toxic metal leaching characteristics of less than the values set forth in Table I.

29. A process as set forth in claim 8, wherein said wastewater has a temperature of between about 32° F. and about 50° F.

30. The process of claim 8, further comprising the step of adding an effective amount of coagulant to wastewater treated in accordance with step (b) to facilitate the formation of a sludge.

31. A process as set forth in claim 30, wherein said coagulant is a non-ionic or anionic polymer.

32. A process for treating water containing heavy metals and sulfate ions, comprising:
(a) treating wastewater containing various heavy metals and a sufficient amount of sulfates capable of reacting with calcium ions to form gypsum in a first reaction vessel with an effective amount of calcium oxide and/or calcium hydroxide, said amount effective to adjust the pH of the wastewater to a level where various metals in said wastewater form insoluble complexes;
(b) directing said wastewater treated in accordance with step (a) to a second reaction vessel and adding an effective amount of sodium carbonate to said treated waste-water to allow the formation to calcium carbonate and reduce the formation of said gypsum;
(c) adding a coagulant to wastewater in said second reaction vessel to facilitate separation of heavy metal oxides and calcium carbonate formed in steps (a) and (b) without the use of a filter; and
(d) eluting water treated in accordance with step (c) into a third reaction vessel and adjusting the pH of said effluent to a substantially neutral pH.

33. A process as set forth in claim 32, wherein steps (a) and (b) are conducted in the same reaction vessel.

34. A process as set forth in claim 32, wherein said water in said third reaction vessel is adjusted to a pH of between about 6 and about pH 9.

35. A process for softening hard water without the need for filtration comprising:
(a) precipitating heavy metals from said water by adding an effective amount of lime to water containing a sufficient amount of sulfate ions capable of reacting with calcium ions to form gypsum;
(b) precipitating calcium carbonate from the water resulting from step (a) and substantially reducing the formation of said gypsum by adding sodium carbonate to said water;
(c) adding a coagulant to said water resulting from step (b) to facilitate precipitation of heavy metals and calcium carbonate;

(d) separating the resulting precipitate from said water; and (e) adjusting the pH of water resulting from step (d) in a range from between about pH 6 and about pH 9.

36. The process of claim 35, wherein said addition of coagulant facilitates the formation of a highly stable, substantially dewatered sludge having toxic leaching characteristics below the values as set forth in Table 1.

* * * * *